(12) United States Patent
Bundy et al.

(10) Patent No.: US 9,202,246 B1
(45) Date of Patent: Dec. 1, 2015

(54) SYSTEM AND METHOD FOR PROVIDING SUBSTITUTE ITEM RECOMMENDATIONS IN ORDER STATUS MESSAGES

(75) Inventors: Michael E. Bundy, Seattle, WA (US); Cary Rotman, Seattle, WA (US); Jacob Lucas, Seattle, WA (US); Mukul Karnik, Redmond, WA (US); Tony Kanawati, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1332 days.

(21) Appl. No.: 12/909,522

(22) Filed: Oct. 21, 2010

(51) Int. Cl.
*G06Q 30/00* (2012.01)
*G06Q 30/06* (2012.01)

(52) U.S. Cl.
CPC ........ *G06Q 30/0635* (2013.01); *G06Q 30/0641* (2013.01)

(58) Field of Classification Search
CPC .................................................. G06Q 30/0635
USPC ....................................................... 705/26.81
See application file for complete search history.

(56) References Cited

U.S. PATENT DOCUMENTS

| | | | | |
|---|---|---|---|---|
| 5,832,459 | A * | 11/1998 | Cameron et al. | 705/14.4 |
| 6,609,108 | B1 * | 8/2003 | Pulliam et al. | 705/26.5 |
| 7,117,163 | B1 | 10/2006 | Iyer et al. | |
| 7,257,552 | B1 * | 8/2007 | Franco | 705/28 |
| 7,308,330 | B2 * | 12/2007 | Jones | 700/100 |
| 7,672,874 | B2 * | 3/2010 | Bezos et al. | 705/26.62 |
| 7,685,024 | B2 * | 3/2010 | Ofer et al. | 705/26.7 |
| 8,090,626 | B1 | 1/2012 | Wijaya et al. | |
| 8,195,527 | B2 | 6/2012 | Chowdhary et al. | |
| 8,275,674 | B2 | 9/2012 | Kane, Jr. et al. | |
| 8,285,602 | B1 | 10/2012 | Yi et al. | |
| 8,301,623 | B2 | 10/2012 | Chakrabarti et al. | |
| 2002/0095307 | A1 * | 7/2002 | Greamo et al. | 705/1 |
| 2002/0188499 | A1 * | 12/2002 | Jenkins et al. | 705/10 |
| 2003/0093307 | A1 * | 5/2003 | Renz et al. | 705/7 |
| 2003/0132298 | A1 * | 7/2003 | Swartz et al. | 235/472.02 |
| 2005/0154652 | A1 * | 7/2005 | Bezos et al. | 705/27 |
| 2006/0101742 | A1 * | 5/2006 | Scott-Leikach et al. | 52/235 |
| 2006/0237532 | A1 * | 10/2006 | Scott-Leikach et al. | 235/383 |
| 2006/0259338 | A1 * | 11/2006 | Rodrigue et al. | 705/7 |
| 2007/0203798 | A1 * | 8/2007 | Caballero et al. | 705/26 |
| 2010/0023340 | A1 * | 1/2010 | Chowdhary et al. | 705/1 |
| 2012/0059691 | A1 * | 3/2012 | Miles et al. | 705/14.1 |

\* cited by examiner

*Primary Examiner* — Seye Iwarere
(74) *Attorney, Agent, or Firm* — Robert C. Kowert; Meyertons, Hood, Kivlin, Kowert & Goetzel, P.C.

(57) ABSTRACT

Various embodiments of a system and method for providing substitute item recommendations in order status messages are described. In various embodiments, a customer may submit an order for one or more items to a merchant. In various cases, the merchant may fulfill the order by preparing a shipment that includes the one or more ordered items and shipping that shipment to the customer. In some cases, at least one item of the order may be delayed or canceled for a variety of reasons. In various embodiments, the merchant may utilize an exception management component to generate an orders status message (for the customer) that specifies the item has been delayed or canceled. The merchant may also utilize the exception management component to generate the order status message such that the order status message also includes a recommendation of one or more substitute items that the customer may be interested in.

34 Claims, 6 Drawing Sheets order status message 300

Hello from <merchant>.com.

We're writing about the order you placed on May 21 (Order# 105-1746405-5440295). Unfortunately, we are unable to ship the item(s) as soon as we expected and need to provide you with a new estimate of when the item(s) may be delivered:

— 302

"Acme Dive Watch 200m WR, Stainless Steel, Automatic" [Watch]
www.<merchant>.com/B0009P52W
Estimated arrival date: May 26 - May 27 — 304

Because we were unable to meet our guaranteed delivery date promise, we are refunding the shipping charges for your entire order. This refund should be processed within the next few days, and we will send you an e-mail to let you know when the refund has been completed.

We will make every effort to get the delayed item(s) to you as soon as possible and we'll send you an e-mail to confirm shipment.

Any other items in your order will not be affected by this delay.

As an alternative to waiting for your item, you may be interested in purchasing one of the following substitute items that are in-stock and available to be delivered by your original May 24 delivery date:

— 306a — 310a

-"Acme Dive Watch 200m WR, Leather, Automatic" [Watch]   ( Buy now 308a )  ☑ Auto-cancel delayed item?
www.<merchant>.com/B0009P65X
-"Acme Dive Watch 200m WR, Stainless Steel, Quartz" [Watch]  ( Buy now 308b )  ☐ Auto-cancel delayed item?
www.<merchant>.com/B0009P67L
— 306b
— 310b We apologize for the inconvenience caused by this delay.

*****
WHY WAS MY ORDER DELAYED?
While we do our best to adhere to our delivery estimates, our inventory is constantly changing based on information we receive directly from our suppliers. Occasionally, unexpected fluctuations in supply, delays during shipping, or changes in release dates for new products will add time to our original delivery estimate.

Sincerely,

Customer Service Department
http://www.<merchant>.com
==============================
Check your order and more: http://www.<merchant>.com/your-account

FIG. 3

SYSTEM AND METHOD FOR PROVIDING SUBSTITUTE ITEM RECOMMENDATIONS IN ORDER STATUS MESSAGES

BACKGROUND

Online commerce has become a convenient and accessible alternative to shopping at brick and mortar retail locations. For instance, customers may visit a merchant's website to browse an electronic catalog of items through a web browser. The merchant's website may include a virtual shopping cart in which a customer may place items they desire to purchase. Customers can complete a checkout process offered by the merchant's website in order to purchase the items in the virtual shopping cart. The merchant may operate a network of one or more order fulfillment centers at which items of the customer's order are prepared for shipping. The merchant may provide a prepared shipment that includes purchased items to a shipment carrier. The shipment carrier may operate a shipping network capable of delivering shipments to customer-specified locations, such as a residential address. In many cases, the merchant may keep a customer apprised of the status of their order through one or more messages. These messages may be delivered through a variety of channels, such as electronic mail ("email"), text messaging (e.g., Short Message Service (SMS) messages), or other types of electronic messages.

BRIEF DESCRIPTION OF THE DRAWINGS

FIG. 3 illustrates an example order status message that includes an item substitution recommendation, according to some embodiments.

While the system and method for providing substitute item recommendations in order status messages is described herein by way of example for several embodiments and illustrative drawings, those skilled in the art will recognize that the system and method for providing substitute item recommendations in order status messages is not limited to the embodiments or drawings described. It should be understood, that the drawings and detailed description thereto are not intended to limit the system and method for providing substitute item recommendations in order status messages to the particular form disclosed, but on the contrary, the intention is to cover all modifications, equivalents and alternatives falling within the spirit and scope of the system and method for providing substitute item recommendations in order status messages as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Various embodiments of a system and method for providing substitute item recommendations in order status messages are described. In various embodiments, a customer may submit an order for one or more items to a merchant. The merchant may fulfill the order by preparing a shipment that includes the one or more ordered items and shipping that shipment to the customer. In some cases, an item of the order may be delayed or canceled, which may be referred to herein as an exception. For instance, a vendor tasked with providing stock of the item to the merchant may fail to provide that stock to the merchant. In another example, an item may be lost or damaged during an order fulfillment process. The merchant may provide the customer with a notification that specifies the item has been delayed or canceled. The merchant may generate the notification such that the notification also includes a recommendation of one or more substitute items that the customer may be interested in. For example, if the delayed or canceled item were a paperback book, the notification may include a recommendation to substitute a hardcover or an electronic version of the same book. In some cases, if the recommended substitute is more expensive than the original item, the substitute item may be offered at a discount, such as to retain goodwill with the customer. Within the context of the book example, the hardcover version may be offered to the customer at the price of the paperback even though the hardcover version of the book is usually more expensive than the paperback.

Figure 1:
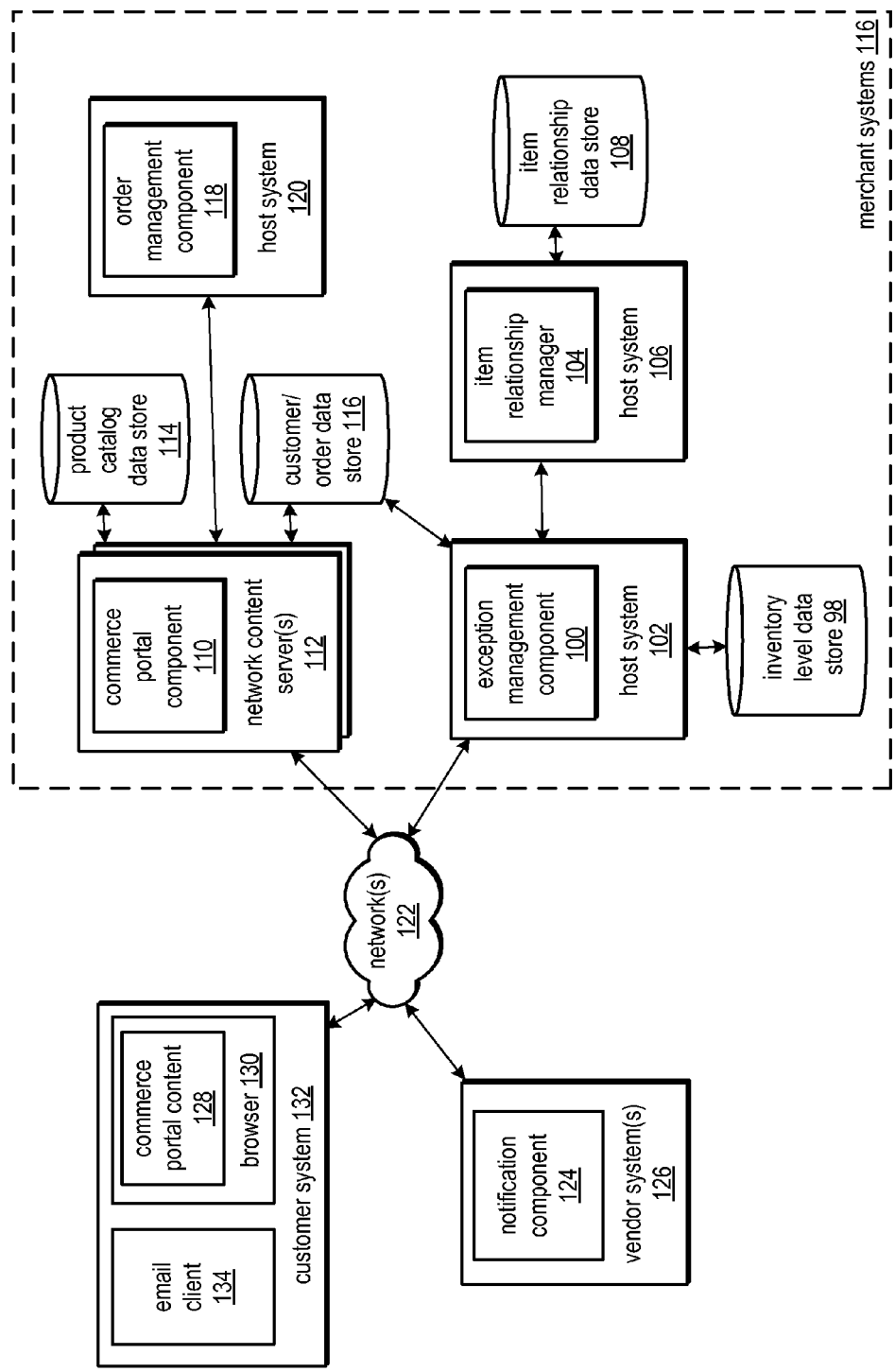
FIG. 1 illustrates a block diagram of an example system configuration including an exception management component and an item relationship manager, according to some embodiments.

FIG. 1 illustrates an example system configuration in which embodiments of the system and method for providing substitute item recommendations in order status messages may be implemented. In the illustrated embodiment, systems associated with a customer, a vendor and a merchant are illustrated. Note that only one customer system and one vendor system are shown for clarity of illustration. It should be understood that in various embodiments, the merchant may interface with multiple customers and multiple vendors. In various embodiments, any of the communications between systems and/or components may be implemented by the exchange of information or data over an electronic network, such as network 122, which may be configured in a manner similar to that of network 685, described below.

In the illustrated embodiment of FIG. 1, a customer may utilize customer system 132 in order to browse an electronic product catalog offered by one or more merchant systems. For instance, merchant systems 116 may include one or more network content server(s) 112 configured to implement commerce portal component 110. In various embodiments, commerce portal component 110 may be the portion of network content server(s) 112 that is responsible for providing commerce portal content 128 to customers. For instance, a customer system 132, such as a computer, may receive commerce portal content 128 via a browser 130. Commerce portal content 128 may include product detail pages for browsing various items and information for purchasing items (e.g., data representing an electronic shopping cart or check-out process). In various embodiments, product detail pages may be generated by commerce portal component 110 based on information from product catalog data store 114, which may include product details (e.g., prices, images, descriptions, customer reviews, etc.) for items offered by the merchant. In various embodiments, the customer may utilize browser 130 to submit an order for one or more items to the merchant. For instance, the customer may utilize browser 130 to add the one or more items to an electronic shopping cart and to purchase the item(s) in the shopping cart. The merchant may store information about the customer (e.g., contact information, shipping information, payment information, etc.) and/or order information (e.g., items in the order, total cost of order, shipping options, etc.) in customer/order data store 116.

In various embodiments, orders submitted by customers may be provided to an order management component, such as order management component 118 of host system 120. In various embodiments, order management component may be configured to assign fulfillment of a customer order to one or more materials handling facilities. One example of a materials handling facility is described below with respect to FIG. 5.

In various embodiments, an exception management component (EMC) 100 implemented on host system 102 may be configured to determine when an exception occurs for any outstanding customer orders. An exception may include but is not limited to a delay in the availability of an item or an outright cancellation of an item. In one example, a vendor may utilize a notification component 124 (implemented on a vendor system 126) to send a delay or cancellation message to the merchant (e.g., to EMC 100). A delay message may indicate that the supply of one or more items (from the vendor to the merchant) may have been delayed for some quantity of time. A cancellation message may indicate that the supply of one or more items (from the vendor to the merchant) has been cancelled with no immediate prospect of being reinitiated. In some cases, the merchant may have the requisite inventory on hand to overcome a delay or cancellation of inventory supply from a vendor. Accordingly, EMC 100 may be configured to monitor inventory levels of items within the merchant's network of materials handling facilities (e.g., warehouses, fulfillment centers, etc.), such as by monitoring one or more data stores that specifies such levels (e.g., inventory level data store 98). EMC 100 may be configured to evaluate such inventory levels and cancellation/delay notifications from vendors in order to determine whether an exception has occurred for a given customer order (e.g., customer orders stored in data store 116). For a given order that is not affected by an exception, order processing may proceed as planned. However, in cases where an order is affected by an exception, EMC may be configured to generate an order status message that indicates an item has been delayed or canceled (according to the exception). The EMC may generate the order status message such that the order status message includes a recommendation of one or more substitute items that may interest the customer that submitted the order. This process is described in more detail with respect to FIG. 2.

Figure 2:
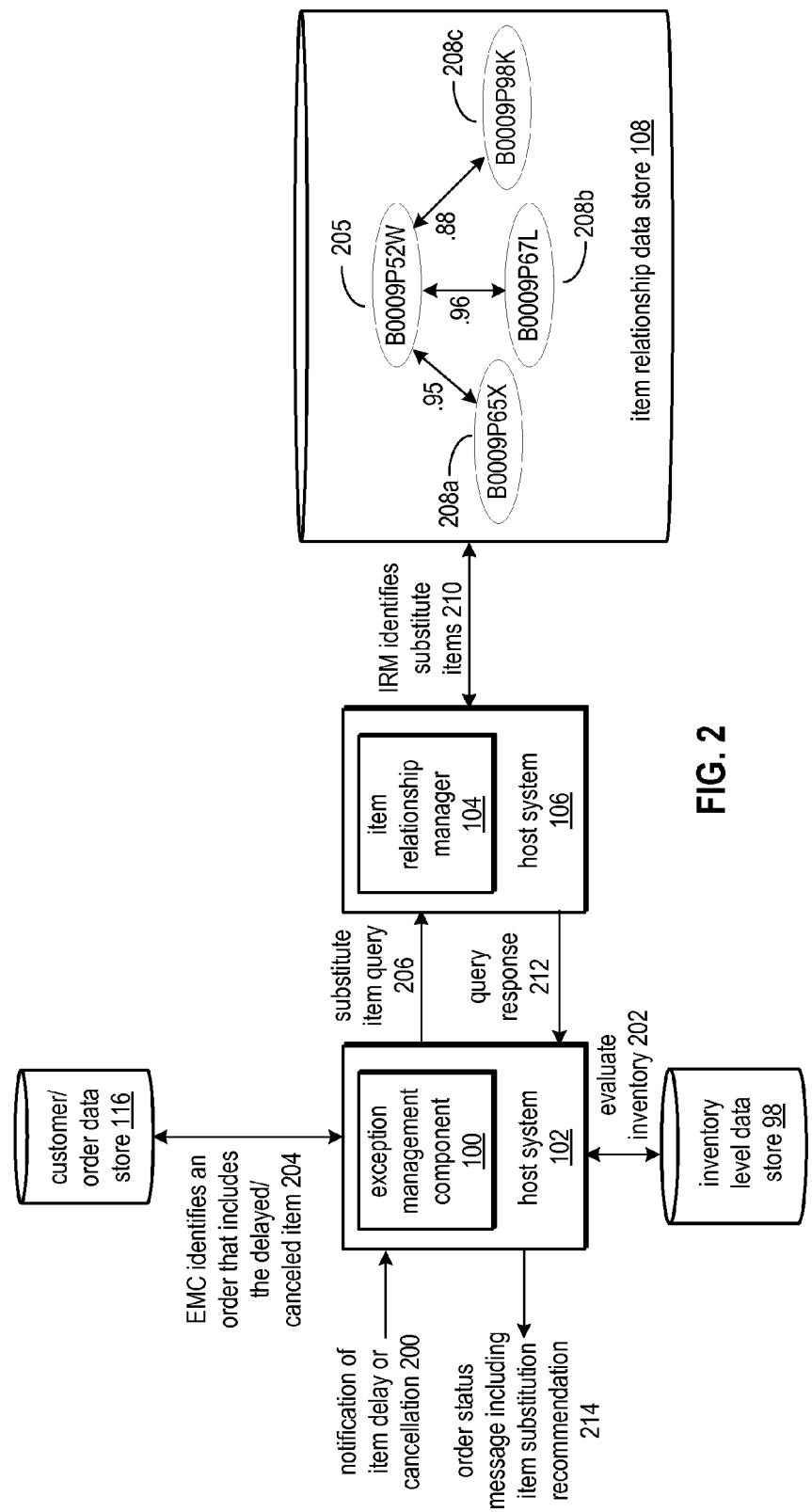
FIG. 2 illustrates a flow diagram of the creation of an order status message that includes an item substitution recommendation, according to some embodiments.

FIG. 2 illustrates the generation of an order status message sent in response to the detection of an order exception, according to some embodiments. As described above, EMC 100 may evaluate a notification of an item delay or cancellation (200) and/or evaluate inventory levels (202) to determine whether an exception (e.g., a delayed or canceled item) exists for an outstanding order (204). If no order is affected by the exception, order processing may proceed as planned. If the EMC determine that a given order is affected by an exception (e.g., the order includes a delayed or canceled item), the EMC may query (206) item relationship manager (IRM) 104, which may be configured to generate and/or maintain an item relationship data store 108. The contents of the corresponding query response 212 and the manner in which IRM generates such response are described in more detail below.

As described above, IRM 104 may be configured to maintain item relationship data store 108 that includes an item relationship model. The item relationship model may include, for each of multiple items offered by the merchant, indications of one or more additional items that have been determined to be substitutes for that item. For instance, in the illustrated embodiment, an item 205 may be associated with three different substitute items 208a-c. For instance, item 205 might be a paperback book, item 208a might be a hardcover version of the same book, item 208b might be an electronic version of the same book, and item 208c might be an abridged version of the same book. In the illustrated embodiment, only one mapping of a given item to multiple substitute items is shown for clarity of illustration; however, it should be understood that multiple different ones of such mappings may be stored in data store 108 in various embodiments.

In various embodiments, the substitutability of different item pairs of item relationship data store 108 may be based on a variety of criteria. In some embodiments, items in the item relationship data store may be specified as substitutes if the items are different editions of the same content (e.g., a book or other text based content). For instance, item relationship data store 108 may indicate that the 4th edition of a textbook may be substituted with a 5th edition of the same textbook. In some embodiments, items in the item relationship data store may be specified as substitutes if the items are members of an assortment of the same item. In some cases, an assortment of the same item may be an assortment of items that only vary by a non-functional or cosmetic characteristic. For instance, a digital music player may be sold in an assortment of different colors. In this example, different colored versions of the same digital music player may be specified as substitutes in item relationship data store 108. In some embodiments, items in the item relationship data store may be specified as substitutes if such items are related by a binding relationship. For instance, certain types of content (e.g., books) may be represented in different physical or electronic forms. For instance, a certain book may be sold as a hardcover book, a paperback book, or an electronic book. In some embodiments, relationships between items may be based on historical ordering or viewing activity within the merchant's commerce portal, such as the commerce portal provided by commerce portal component 110. For example, in some cases, items may be designated within data store 108 as being substitutable if such items are frequently ordered together through the commerce portal and/or if product detail pages of such items are frequently viewed together within the same browsing session.

In some embodiments, for different pairs of items that are designated as substitutes, item relationship data store 108 may also indicate a relationship score indicative of the strength of substitutability of the items. In the illustrated embodiment, these scores are shown on a scale of zero (0) to one (1). For instance, the relationship score between item 205 and item 208a is 0.95, the relationship score between items 205 and 208b is 0.96, and the relationship score between items 205 and 208c is 0.88. As illustrated by these scores, the strength of substitutability between items 205 and 208b is greater than the substitutability between items 205 and the other illustrated items.

IRM 104 may generate query response 212 based on the item relationship data of item relationship data store 108. In various embodiments, IRM 104 may identify the exception item specified query 206 and evaluate item relationship data store 108 to identify one or more substitute items for the exception item (210). In the illustrated example, item 205 may serve as the exception item (e.g., the item canceled or delayed), and items 208a-c may be items designate as substitutes for item 205 (or at least items that have been determined to be substitutes to some degree). In some cases, IRM 104 may generate the query 212 such that the query specifies all items designated as substitutes for the exception item within item relationship data store 108. In other cases, IRM 104 may evaluate the substitutes and eliminate from consideration, substitute items having a relationship score below a desired relationship score (e.g., a threshold score). For instance, if IRM 104 were to use a desired relationship score of 0.90, item 208c would be eliminated from consideration (e.g., because item 208c has a relationship score of 0.88 with item 205). In this example, IRM 104 may generate query response 212 such that the query response indicates only items 208a-b as substitutes for item 205. In other cases, IRM 104 may not eliminate items from consideration according to these techniques and may instead generate query response 212 such that the query response specifies all substitute items and corresponding scores (as specified by data store 108). In this way, exception management component 100 may evaluate all possible substitute items and eliminate items from consideration in a manner similar to that described above with respect to IRM 104 (e.g., eliminating substitute items below a desired relationship score).

Exception management component 100 may be configured to generate an order status message that includes an item substitution recommendation; the item substitution recommendation may specify one or more items from query response 212, in various embodiments. In some embodiments, order status message may be an email message that is sent to a known email address for the customer affected by the exception (e.g., the customer that originally ordered the delayed/canceled item). In various embodiments, the customer may utilize email client 134 (FIG. 1) to retrieve such email message or utilize a web-based email client to retrieve such message through browser 130 (FIG. 1). In other cases, EMC 100 may generate the order status message such that the order status message (include the substitute item recommendation) is available to the customer through the commerce portal generated by commerce portal 110. In one example, to access such message, the customer may need to log on to the commerce portal using browser 130 (FIG. 1). In various embodiments, the order status message that includes a substitute item recommendation may be provided to the customer through other channels or techniques, including but not limited to a text message (e.g., SMS text message) or a voice message (e.g., a voice message delivered to a voice mailbox accessible to the customer).

In some embodiments, certain substitute items of response 212 may be favored by EMC 100 for inclusion within the generated order status message. For instance EMC 100 may favor items that are related to the customer's order history (which may be retrieved from data store 116). For instance, based on the customer's order history of one or more items, EMC 100 may determine that the customer favors electronic books (e-books) over hard cover books. In an example where the exception item is a paperback book, EMC 100 may favor an e-book version of the same book over a hardcover version of that book based on the customer's order history. In one example, this favoritism may include generating the order status message such the order status message only includes a recommendation for the e-book instead of the hardcover version. In another example where multiple items are recommended in the order status message, this favoritism may include listing the e-book in a more prominent or more visible position within the order status message relative to the hardcover version. For instance, the e-book version may be listed above the hardcover version in a listing of recommended substitutes.

In some embodiments, the EMC 100 may generate order status messages that recommend certain items if and only if the customer is known to have ordered another item that is necessary to consume that certain item. For instance, EMC 100 may only recommend an e-book to the customer if the EMC 100 determines that the customer has previously ordered an e-book reader capable of consuming that type of e-book. EMC 100 may determine this information from the customer's past order history (e.g., order history from data store 116).

One example of an order status message that may be provided to a customer is illustrated as order status message 300 of FIG. 3. While the illustrated order status message pertains to an item delay, a similar order status message may be generated for an item cancellation. The order status message described here is one non-limiting example of the order status messages that may be generated at 214 described above. In the illustrated embodiment, order status message 300 may specify an exception item 302 (e.g., a delayed item) from an order submitted by the customer. In some cases, the order status message may also specify a new estimated arrival date 304 (or date range) at which the delayed item is expected to arrive at the customers designated shipping address.

In some embodiments, EMC 100 may eliminate certain substitute items from consideration in response to determining that the substitute item is more expensive than the exception item (e.g., the item delayed or canceled). In some cases, this technique may preserve customer goodwill by avoiding scenarios that could be interpreted as a "bait-and-switch." In other cases, substitute items that are more expensive than the exception item may be recommended in the order status message. However, in these cases, EMC 100 may generate the order status message such that the message also indicates a discount offer is available with the more expensive item. The discount offer may include but is not limited to a price discount (full or partial), a shipping discount, or a gift card offer, or some combination thereof. In this way, the order status message may recommend an item that is more expensive (before the discount offer) while retaining customer goodwill.

Order status message 300 may also include a recommendation to purchase one or more items that have been determined to be substitutes for the exception item (e.g., as determined by EMC 100 and/or IRM 104). As illustrated, two items 306a-b are included as part of such recommendation. In some embodiments, the order status message may include controls 308a-b for ordering the substitute items recommended to the customer. For instance, in one example, order status message 300 may be a HyperText Markup Language (HTML) message that includes selectable controls 308a-b for ordering recommended substitute items. In some cases, one or more controls 310a-b may also be provided for automatically cancelling the delayed item in response to the customer ordering one of the recommended substitute items. For example, if the customer selects control 310a before selecting control 308a to order item 306a, the portion of the customer's order corresponding to the delayed item 302 may be canceled automatically (e.g., canceled by EMC 100). In other cases, EMC 100 may enforce such an auto-cancellation policy by default. In these cases, controls 310a-b may be omitted.

Referring collectively to FIGS. 1-3, item substitutability relationships may be specified by a score between a respective pair of items within item relationship data store 108 (as described above). In various embodiments, EMC 100 may be configured to determine that one of the recommended substitute items has been selected for acquisition, such as determining that the customer has selected one of controls 308a-b. In these cases, EMC 100 may utilize the substitute item selected by the user to improve the item relationship data, such as the item relationship data of data store 108. In one example, each time a recommended substitute is selected for acquisition by a customer, EMC 100 (or IRM 104 on behalf of EMC 100) may increase the relationship score between that substitute item and the exception item to indicate that the substitutability relationship has been strengthened. For instance, consider a case where item 205 is the exception item and item 208a is selected for acquisition by the customer. In response to this, EMC 100 (or IRM 104 on behalf of EMC 100) may increase the relationship score between these two items from 0.95 to 0.953, in one non-limiting example. Repeating this process over time may in some embodiments improve the effectiveness of the item relationship data of data store 108.

Figure 4:
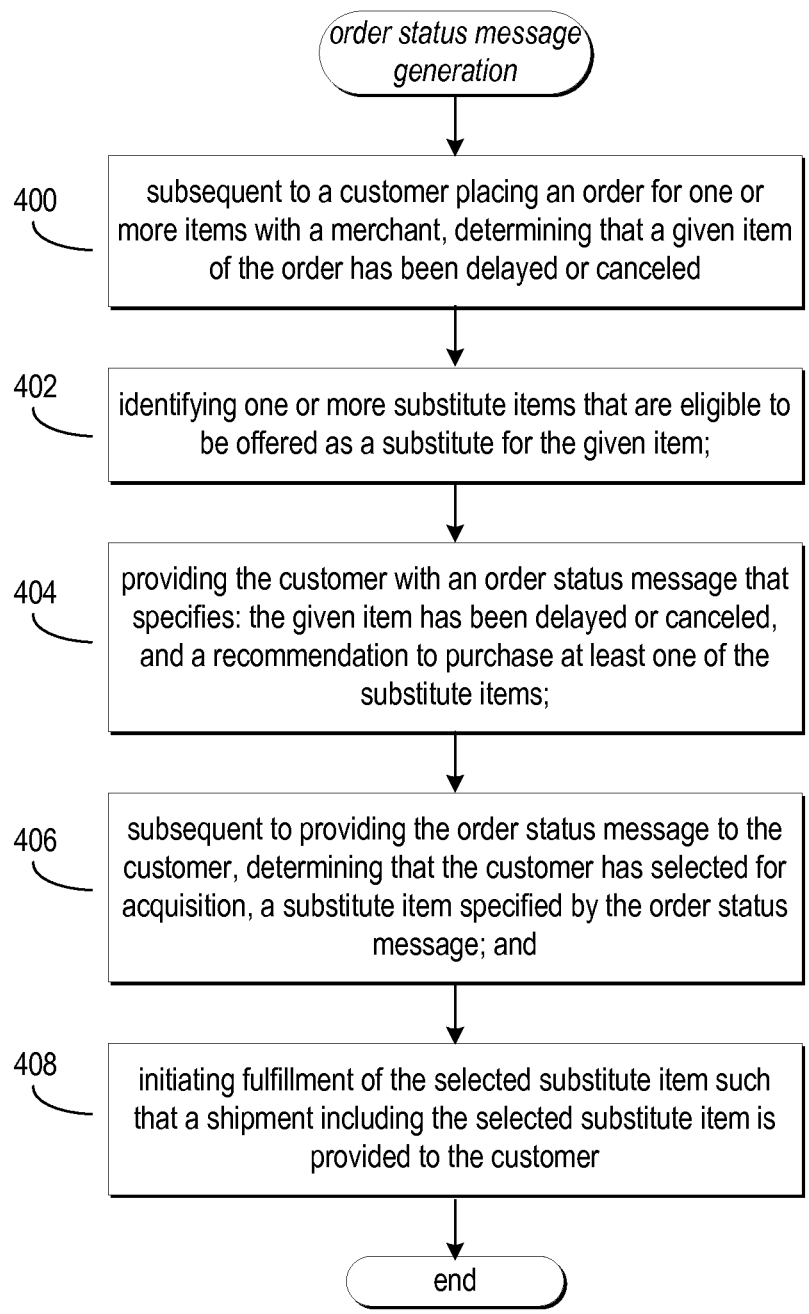
FIG. 4 illustrates an example method for generation of an order status message that includes an item substitution recommendation, according to some embodiments.

FIG. 4 illustrates an example method for generating an order status message that includes a substitute item suggestion. In various embodiments, the illustrated method may be performed by exception management component 100 described above. As illustrated at 400, the method may include, subsequent to a customer placing an order for one or more items with a merchant, determining that a given item of the order has been delayed or canceled. In various embodiments, this may include receiving an exception notification from a vendor. For instance, a vendor that previously committed to supplying units of an item may provide an exception notification that specifies such units are delayed until a date later than expected or that the supply of such units is canceled altogether. In other case, determining that a given item of the order has been delayed or canceled may include monitoring inventory levels for one or more materials handling facilities, such as inventory levels of data store 98, to determine that an item of the customer's order will not be in stock in time for the order to be fulfilled by the original delivery estimate. In some cases, determining that a given item has been delayed or canceled may include determining that an item was damaged or lost during an order fulfillment process. For instance, an item (or an item's product packaging) may be damaged or lost during any of the processes performed within the materials handling facility of FIG. 5, described below. In one non-limiting example, an item might be damaged or lost after falling off a conveyance system (e.g., a motorized belt or cart), which may occur infrequently. In these cases, the item may need to be replaced with another item from inventory or from a vendor. This replacement process may cause a delay in the fulfillment of an order that includes the damaged item. In various embodiments, items may be delayed or canceled for other reasons; embodiments are not limited to the reasons described above.

As illustrated at 402, the method may include identifying one or more substitute items that are eligible to be offered as a substitute for the given item. In various embodiments, this may include evaluating an item relationship data store, such as item relationship data store 108. For example, such an item relationship data store may, for a particular item, specify one or more other items that may serve as substitutes for the given item. In various embodiments, the method may include submitting requesting such information from another element, such as by submitting a substitute item query 206 (described above) to an item relationship manager, such as item relationship manager 104. Identifying the substitute items may include receiving a response to such a request (e.g., query response 212, described above). Generally, this portion of the method may include any technique described above for identifying substitute items for a given item.

As illustrated at 404, the method may also include providing the customer with an order status message that specifies i) the given item has been delayed or canceled, and a recommendation to purchase at least one of the substitute items identified at 402. For example, this portion of the method may include generating an order status message similar to that of FIG. 3, described above.

As illustrated at 406, the method may include, subsequent to providing the order status message to the customer (e.g., via email or through a commerce portal), determining that the customer has selected for acquisition, a substitute item specified by the order status message. For example, this portion of the method may include determining that the customer has selected a control for ordering one of the substitute items, such as controls 308a-b described above. In other cases, this portion of the method may include determining that the customer has ordered one of the recommended substitute items through a commerce portal (e.g., the commerce portal provided by commerce portal component 110).

As illustrated at 408, the method may include initiating fulfillment of the selected substitute item such that a shipment including the selected substitute item is provided to the customer. For instance, this portion of the method may include submitting an order for the substitute item to an order management component, such as order management component 118, which may assign the substitute order to a materials handling facility. The materials handling facility may prepare a shipment that includes the item and ship that shipment to the customer. One example of such a materials handling facility is described below with respect to FIG. 5.

In various embodiments, the method may include ensuring that the substitute item that is chosen can be delivered to the customer before the delayed item. In other words, the method may include avoiding recommending substitute items that will not improve the delivery date to the customer. For example, for a given item has been delayed until a first time, the method may include enforcing a requirement that the substitute item must be an item eligible to be provided to the customer prior to the first time.

In various embodiments, to determine that a given item of the order has been delayed or canceled, the method may include determining that a vendor of the merchant has delayed or cancelled fulfillment of a purchase order for one or more units of the given item. For instance, as described above, the vendor entity may be tasked with providing the merchant with units of one or more inventory items. In some cases, the merchant may provide a purchase order to the vendor to specify which items are desired by the merchant. Determining that an item has been delayed or canceled may include determining that the vendor has delayed or canceled items from such a purchase order.

In various embodiments, providing the order status message to the customer may include providing the message to the customer via a messaging interface of a commerce portal. For instance, as described above, commerce portal component 110 may implement a commerce portal by providing commerce portal content 128 to customer system 132. In various embodiments, the method may include utilizing a commerce portal component 110 to provide a messaging interface and to provide the order status message (that includes a recommendation for one or more substitute items) through that message interface (e.g., as commerce portal content 128).

Figure 5:
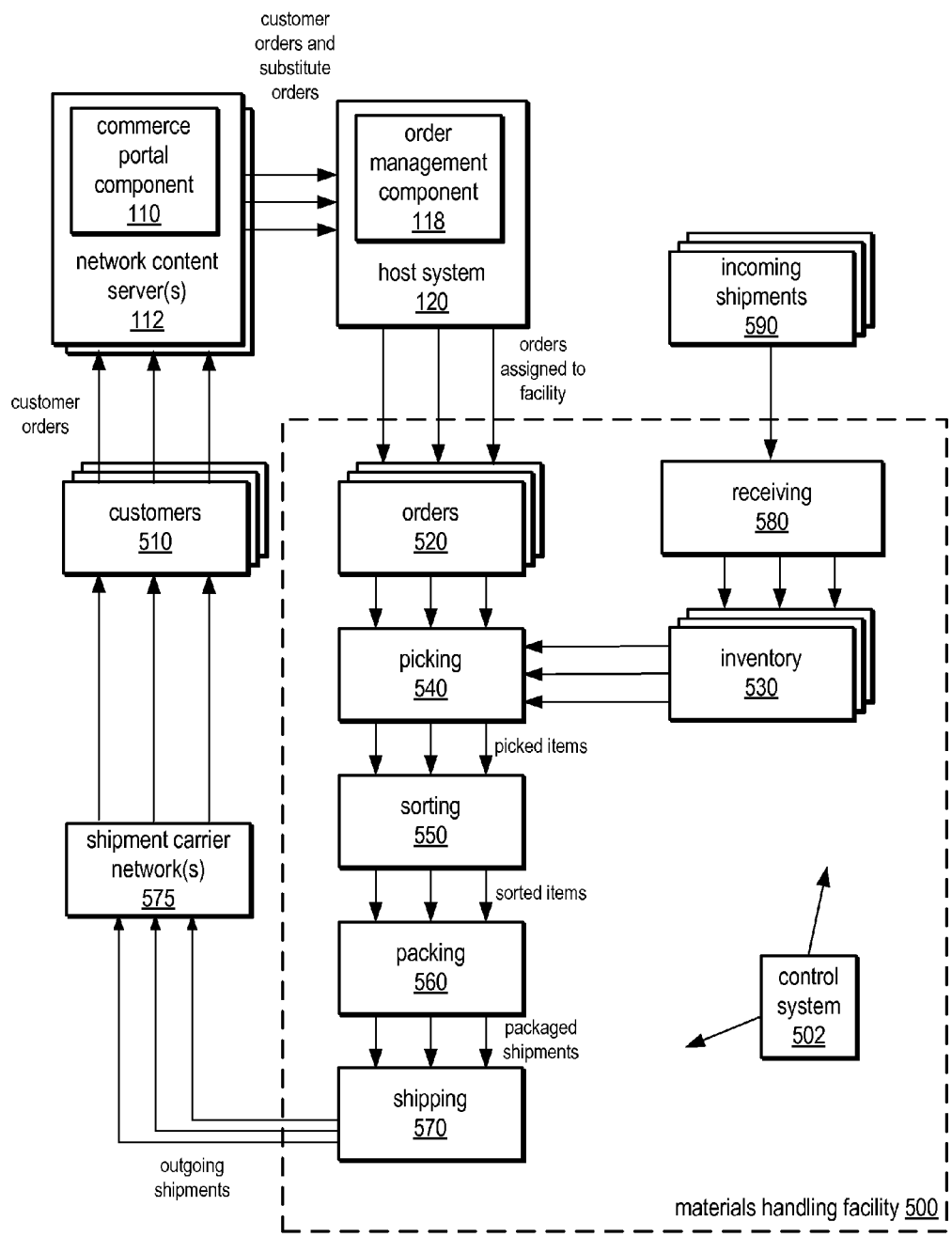
FIG. 5 illustrates one example of a materials handling facility according to some embodiments.

FIG. 5 illustrates a logical representation or view of the operation of a materials handling facility 500 of various embodiments of the system and method for providing substitute item recommendations in order status messages. In various embodiments, a fulfillment network including multiple materials handling facilities (each of which may be configured in a manner similar to that of materials handling facility 500) may be responsible for fulfilling multiple orders, such as orders placed through an electronic commerce ("e-commerce") portal, such as commerce portal component 110 (described in more detail with respect to previous Figures).

In various embodiments, a materials handling facility may include one or more facilities that process, store, and/or distribute units of items including but not limited to warehouses, distribution centers, hubs, fulfillment centers, nodes in a supply chain network, retail establishments, shipping facilities, stock storage facilities, or any other facility configured to process units of items. For example, this Figure may illustrate an order fulfillment center of a product distributor, according to some embodiments. Multiple customers 510 may submit orders to commerce portal component 110 (which may be implemented on one or more network content servers 112), where each order specifies one or more items from inventory 530 to be shipped to the customer that submitted the order. The customer orders may be provided to order management component 118, which as described above may assign such orders to a materials handling facility (e.g., a fulfillment center), as illustrated as orders 520. As described above, in various embodiments, the merchant may determine when a customer selects a substitute item for acquisition (e.g., after the customer is provided with an order status message that recommends one or more items). In these cases, commerce portal component 110 may also provide order management component 118 with substitute orders that specify any substitute items specified by the customer. The order management component may assign any of the above-described orders to a materials handling facility in order to initiate fulfillment of the orders. In the illustrated embodiments, the orders assigned to materials handling facility 500 are illustrated as orders 520.

To fulfill the orders 520, the one or more items specified in each order may be retrieved, or picked, from inventory 530 (which may also be referred to as stock storage) in the materials handling facility, as indicated at 540. Picked items may be delivered or conveyed, if necessary, to one or more stations in the materials handling facility for sorting 550 into their respective orders, packing 560, and finally shipping 570 to the customers 510. In various embodiments, picked items may be delivered to a station where individual units of items are associated with and placed into particular conveyance receptacles, which are then inducted into a conveyance mechanism. The conveyance receptacles may then be routed to particular destinations for the items contained within the receptacles in accordance with the requests (orders) currently being processed, e.g. to sorting stations, under direction of a control system (e.g., control system 502). A picked, packed and shipped order does not necessarily include all of the items ordered by the customer; an outgoing shipment to a customer may include only a subset of the ordered items available to ship at one time from an inventory storage location.

A materials handling facility may also include a receiving 580 operation for receiving shipments of stock (e.g., units of inventory items) from one or more sources (e.g., vendors) and for moving or "stowing" the received stock into stock storage (e.g., inventory 530). As described above, when incoming shipments are delayed or canceled by the vendor, exceptions may occur for customer orders relying on such items. In various embodiments, the receiving 580 operation may also receive and process returned purchased or rented items or orders from customers. At least some of these items are typically returned to inventory 530. The various operations of a materials handling facility may be located in one building or facility, or alternatively may be spread or subdivided across two or more buildings or facilities. In various instances, it should be understood that references to elements, units, items, processes (or anything else) as being located within materials handling facility 500 may easily be extended to encompass elements, units, items, processes (or anything else) proximate to but not physically located within materials handling facility. For example, various elements, units, items, or processes (or anything else) may be implemented outside of the materials handling facility, according to some embodiments.

In various embodiments, shipments of one or more items at shipping 570 may be transferred to one or more shipment carrier network(s) 575. Each shipment carrier's network may include one or more distribution facilities for storing items (e.g., hubs) as well as vehicles for conveying shipments (e.g., trucks) from such distribution facilities and/or materials handling facilities (such as materials handling facility 500) to various destinations (e.g., customer specified destinations).

Various embodiments of the system and method for providing substitute item recommendations in order status messages, as described herein, may be executed on one or more computer systems, which may interact with various other devices. Note that any component, action, or functionality described above with respect to FIGS. 1-5 may be implemented via one or more computer systems configured as computer system 600 of FIG. 6, according to various embodiments. For instance, any of customer system 132, vendor system 126, network content server(s) 112, host system 102, host system 106 and/or host system 120 may be implemented by a computer system similar to computer system 600, in various embodiments. In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 650, such as cursor control device 660, keyboard 670, and display(s) 680. In some cases, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 620 may be configured to store program instructions 622 and/or data 632 accessible by processor 610. In various embodiments, system memory 620 may be implemented using any suitable memory technology, such as static random access memory (SRAM), synchronous dynamic RAM (SDRAM), nonvolatile/Flash-type memory, or any other type of memory. In the illustrated embodiment, program instructions 622 implementing exception management component 100 and/or item relationship manager 104 are shown stored within memory. Additionally, data 632 of memory 620 may store any of the information or data structures described above, such as inventory level data store 98, item relationship data store 108 and/or customer/order data store 116. In some embodiments, program instructions and/or data may be received, sent or stored upon different types of computer-accessible media or on similar media separate from system memory 620 or computer system 600. While computer system 600 is described as implementing the functionality of exception management component 100 and/or item relationship manager 104, any of the components or systems illustrated above may be implemented via such a computer system.

In one embodiment, I/O interface 630 may be configured to coordinate I/O traffic between processor 610, system memory 620, and any peripheral devices in the device, including network interface 640 or other peripheral interfaces, such as input/output devices 650. In some embodiments, I/O interface 630 may perform any necessary protocol, timing or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to system memory 620, may be incorporated directly into processor 610.

Network interface 640 may be configured to allow data to be exchanged between computer system 600 and other devices (e.g., customer system 132 and/or vendor system 126) attached to a network 685 or between nodes of computer system 600. Network 685 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more computer systems 600. Multiple input/output devices 650 may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

Figure 6:
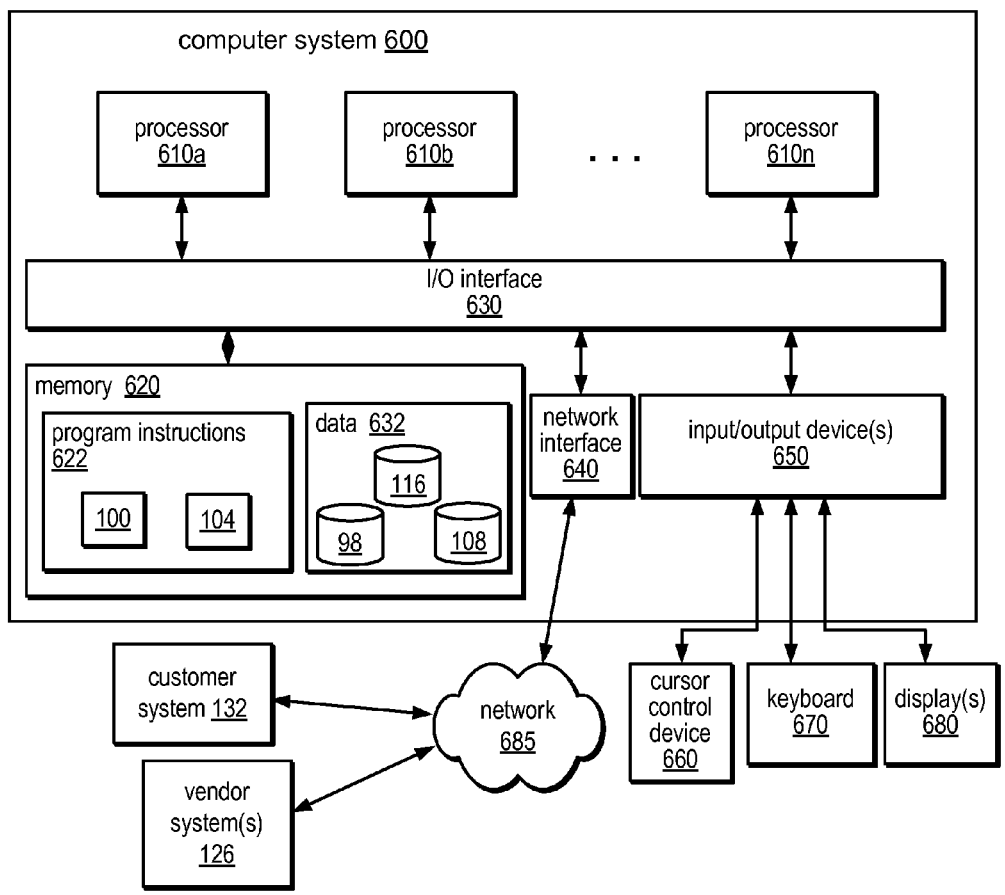
FIG. 6 illustrates one example of a computer system suitable for implementing various elements of the system and method for providing substitute item recommendations in order status messages, according to some embodiments.

As shown in FIG. 6, memory 620 may include program instructions 622 configured to implement any element or action described above. In one embodiment, the program instructions may implement the methods described above, such as the method illustrated by FIG. 4. In other embodiments, different elements and data may be included. Note that data 632 may include any data or information described above.

Those skilled in the art will appreciate that computer system 600 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of embodiments as defined in the claims that follow.

What is claimed is:

1. A computer-implemented method, comprising:
performing, by one or more computing devices:
subsequent to a customer placing an order for one or more items with a merchant for fulfillment at an original delivery estimate time, determining that a given item of the order has been delayed for fulfillment until a delayed time;
identifying one or more substitute items that are eligible to be offered as a substitute for the given item, wherein the delayed time is used for identifying whether at least one of the one or more substitute items qualifies as a substitute such that at least one of the one or more substitute items identified is available after the original delivery estimate time and prior to the delayed time;
providing the customer with an order status message that specifies: the given item has been delayed, and a recommendation to substitute in the order at least one of the substitute items for the given item;
subsequent to providing the order status message to the customer, determining that the customer has selected for acquisition, a substitute item specified by the order status message; and
initiating fulfillment of the selected substitute item such that a shipment including the selected substitute item is provided to the customer.

2. The computer-implemented method of claim 1, wherein delivery of the given item has been delayed until said delayed time, wherein the method comprises enforcing a requirement that the at least one substitute of the order status message item must be an item eligible to be provided to the customer prior to said delayed time.

3. The computer-implemented method of claim 1, wherein determining that a given item of the order has been delayed comprises determining that a vendor of the merchant has delayed or cancelled fulfillment of a purchase order for one or more units of the given item, the purchase order submitted to said vendor by said merchant.

4. The computer-implemented method of claim 1, wherein determining that the given item of the order has been delayed comprises determining that a unit of the given item has been lost or damaged during an order fulfillment process performed at a materials handling facility of the merchant.

5. The computer-implemented method of claim 1, wherein said order status message is an electronic mail message sent to an electronic mail address specified for the customer.

6. The computer-implemented method of claim 1, wherein the method comprises providing to the customer, data representing an electronic commerce portal that includes a messaging interface; wherein the method comprises providing said order status message to the customer through the messaging interface.

7. The computer-implemented method of claim 1, wherein the method comprises:
storing a model of relationships between different items of a catalog of items offered by the merchant; and
wherein identifying one or more substitute items comprises evaluating relationships of the model to determine the one or more substitute items for the given item.

8. The computer-implemented method of claim 7:
wherein different pairs of items in the model are associated by a respective relationship score specified by the model; and
wherein evaluating the relationships of the model to determine the one or more substitute items comprises eliminating from consideration items that have a relationship score below a desired relationship score.

9. The computer-implemented method of claim 7:
wherein different pairs of items in the model are associated by a respective relationship score specified by the model; and
wherein the method comprises:
in response to determining that the customer has selected a substitute item for acquisition, increasing a relationship score between the selected substitute item and the given item such that the model indicates the relationship between the selected substitute item and the given item has been strengthened.

10. The computer-implemented method of claim 1, wherein inclusion of at least one of the substitute items within the order status message is based on an order history of items previously ordered by the customer.

11. The computer-implemented method of claim 10, wherein said inclusion of the at least one substitute item is dependent on a determination that said order history indicates the customer has ordered an item required for consumption of said at least one substitute item.

12. The computer-implemented method of claim 1, wherein the method comprises eliminating an identified substitute item from consideration for inclusion in the order status message in response to determining that substitute item is more expensive than said given item.

13. The computer-implemented method of claim 1, wherein the method comprises:
determining that at least one of the identified substitute items is more expensive than said given item; and
wherein the order status message provided to the customer indicates said at least one of the identified substitute items is available with a discount offer.

14. The computer-implemented method of claim 1, wherein for at least one recommended substitute item of the order status message, the order status message includes a respective control for ordering that recommended substitute item.

15. The computer-implemented method of claim 1, wherein the method comprises:
in response to determining that the customer has selected a substitute item for acquisition, canceling the portion of the order corresponding to the given item.

16. A system, comprising:
a memory; and
one or more processors coupled to the memory, wherein the memory comprises program instructions executable by the one or more processors to:
subsequent to a customer placing an order for one or more items with a merchant for fulfillment at an original delivery estimate time, determine that a given item of the order has been delayed for fulfillment until a delayed time;
generate a request for an indication of one or more items designated as substitutes to the given item that has been delayed;
apply a requirement that at least one of the one or more particular items designated as substitutes be selected based, at least part, on the delayed time such that at least one of the one or more specified substitute items is available after the original delivery estimate time and prior to the delayed time;

receive a response to the request, the response specifying one or more substitute items that have been designated as substitutes for the given item; and generate an order status message that specifies: the given item has been delayed, and a recommendation to purchase at least one of the substitute items.

17. The system of claim 16, wherein delivery of the given item has been delayed until said delayed time, wherein the program instructions are configured to enforce a requirement that the at least one substitute item of the order status message must be an item eligible to be provided to the customer prior to said delayed time.

18. The system of claim 16, wherein to determine that a given item of the order has been delayed, the program instructions are configured to determine that a vendor of the merchant has delayed or cancelled fulfillment of a purchase order for one or more units of the given item, the purchase order submitted to said vendor by said merchant.

19. The system of claim 16, wherein to determine that the given item of the order has been delayed, the program instruction are configured to determine that a unit of the given item has been lost or damaged during an order fulfillment process performed at a materials handling facility of the merchant.

20. The system of claim 16, wherein the program instructions are configured to send the order status message as an electronic mail message to an electronic mail address specified for the customer.

21. The system of claim 16, wherein the program instructions are configured to eliminate an identified substitute item from consideration for inclusion in the order status message in response to determining that substitute item is more expensive than said given item.

22. The system of claim 16, wherein the program instructions are configured to:
   determine that at least one of the identified substitute items is more expensive than said given item; and
   generate the order status message such that the order status message indicates said at least one of the identified substitute items is available with a discount offer.

23. The system of claim 16, wherein for at least one recommended substitute item of the order status message, the program instructions are configured to generate the order status message such that the order status message includes a respective control for ordering that recommended substitute item.

24. The system of claim 16, wherein the program instructions are configured to:
   in response to determining that the customer has selected a substitute item for acquisition, cancel the portion of the order corresponding to the given item.

25. A non-transitory computer-readable storage medium, storing program instructions computer-executable on one or more computers to:
   subsequent to a customer placing an order for one or more items with a merchant for fulfillment at an original delivery estimate time, determine that a given item of the order has been delayed for fulfillment until a delayed time;
   determine one or more substitute items that have been designated as substitutes for the given item, wherein the delayed time is used for identifying whether at least one of the one or more substitute items qualifies as a substitute such that at least one of the one or more substitute items identified is available after the original delivery estimate time and prior to the delayed time; and
   generate an order status message that specifies: the given item has been delayed, and a recommendation to purchase at least one of the substitute items.

26. The non-transitory computer-readable storage medium of claim 25, wherein the program instructions are configured to:
   store a model of relationships between different items of a catalog of items offered by the merchant; and
   evaluate relationships of the model to determine the one or more substitute items for the given item.

27. The non-transitory computer-readable storage medium of claim 26:
   wherein different pairs of items in the model are associated by a respective relationship score specified by the model; and
   wherein to evaluate the relationships of the model to determine the one or more substitute items, the program instructions are configured to eliminate from consideration items that have a relationship score below a desired relationship score.

28. The non-transitory computer-readable storage medium of claim 26:
   wherein different pairs of items in the model are associated by a respective relationship score specified by the model; and
   wherein the program instructions are configured to:
      in response to determining that the customer has selected a substitute item for acquisition, increase a relationship score between the selected substitute item and the given item such that the model indicates the relationship between the selected substitute item and the given item has been strengthened.

29. The non-transitory computer-readable storage medium of claim 25, wherein inclusion of at least one of the substitute items within the order status message is based on an order history of items previously ordered by the customer.

30. The non-transitory computer-readable storage medium of claim 29, wherein said inclusion of the at least one substitute item is dependent on the program instructions determining that said order history indicates the customer has ordered an item required for consumption of said at least one substitute item.

31. The non-transitory computer-readable storage medium of claim 25, wherein the program instructions are configured to eliminate an identified substitute item from consideration for inclusion in the order status message in response to determining that substitute item is more expensive than said given item.

32. The non-transitory computer-readable storage medium of claim 25, wherein the program instructions are configured to:
   determine that at least one of the identified substitute items is more expensive than said given item; and
   generate the order status message provided to the customer such that the order status message indicates said at least one of the identified substitute items is available with a discount offer.

33. The non-transitory computer-readable storage medium of claim 25, wherein for at least one recommended substitute item of the order status message, the order status message includes a respective control for ordering that recommended substitute item.

34. The non-transitory computer-readable storage medium of claim 25, wherein the program instructions are configured to:
   in response to determining that the customer has selected a substitute item for acquisition, cancel the portion of the order corresponding to the given item.

* * * * *